US012753601B2

(12) United States Patent
Sharma et al.

(10) Patent No.: US 12,753,601 B2
(45) Date of Patent: Oct. 6, 2026

(54) METHOD OF ENCAPSULATING A PHASE CHANGE MATERIAL

(71) Applicant: UT-Battelle, LLC, Oak Ridge, TN (US)

(72) Inventors: Jaswinder K. Sharma, Oak Ridge, TN (US); Georgios Polyzos, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 639 days.

(21) Appl. No.: 18/119,890

(22) Filed: Mar. 10, 2023

(65) Prior Publication Data

US 2023/0295918 A1 Sep. 21, 2023

Related U.S. Application Data

(60) Provisional application No. 63/320,794, filed on Mar. 17, 2022.

(51) Int. Cl.
*E04B 1/78* (2006.01)
*C09K 5/14* (2006.01)

(52) U.S. Cl.
CPC . *E04B 1/78* (2013.01); *C09K 5/14* (2013.01)

(58) Field of Classification Search
None
See application file for complete search history.

(56) References Cited

U.S. PATENT DOCUMENTS

2012/0048768 A1* 3/2012 Holloway .............. C09K 5/063 206/524.1
2013/0064862 A1* 3/2013 Weitz ...................... A23P 10/30 252/183.11
2020/0339857 A1* 10/2020 DeWitt .................... D01D 1/02

FOREIGN PATENT DOCUMENTS

CN 106140037 A * 11/2016 ........... A61K 9/5026
WO WO-2007075216 A1 * 7/2007 ............. B32B 15/02

OTHER PUBLICATIONS

CN 106140037 A Eng TRANS (Year: 2016).*

* cited by examiner

*Primary Examiner* — Jeffrey D Washville
(74) *Attorney, Agent, or Firm* — WARNER NORCROSS + JUDD LLP

(57) ABSTRACT

A method of encapsulating a phase change material includes providing a co-axial ejector including first and second coaxially-disposed outlets, with the first outlet being inside of and surrounded by the second outlet. A core composition including a phase change material is fed to the first outlet. A coating composition is fed to the second outlet. The core composition and the coating composition are simultaneously ejected from the ejector onto a collector. The core composition is surrounded by the coating composition and together ejected onto the collector to form an encapsulated core-shell phase change material fiber. No voltage is applied to the ejector during ejection, and the method does not include electrospinning. The core-shell fiber has a phase change material core surrounded by a polymer shell and a diameter in the range of 10-10,000 μm. The core constitutes from 30% to 97% by volume of the core-shell fiber.

15 Claims, 7 Drawing Sheets

METHOD OF ENCAPSULATING A PHASE CHANGE MATERIAL

CROSS-REFERENCE TO RELATED APPLICATIONS

This application claims the benefit of U.S. Provisional Application No. 63/320,794, filed Mar. 17, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to phase change materials, and more particularly to a method of encapsulating a phase change material for thermal management and other applications.

BACKGROUND OF THE INVENTION

Thermal energy storage is of paramount importance in the use of renewable energy sources and in reducing building energy loads. For example, by incorporating thermal energy storage materials in the building envelope, the energy loads can be reduced considerably. The thermal energy is stored during daytime when temperatures are high and subsequently released during night when temperatures are low. Such thermal energy management helps to lower energy consumption and thus the utility costs for building owners and occupants.

Thermal energy can be stored by using several technologies; however, the primary means is through the use of phase change materials (PCMs). The main phase change materials are salt hydrates due to their low cost and higher thermal energy storage capacities. However, salt hydrates have their own issues, with leakage of salt hydrates being the biggest concern.

Current state-of-the-art technologies use form-stable methods to minimize the leakage of salt hydrate PCMs. In this approach, salt hydrates are impregnated in high-surface-area materials (generally porous) such as expanded graphite (EG). Several other porous materials exist in the art, however EG is presently the state-of-the-art. The large surface areas and porous nature of these materials help to keep the salt hydrates from undesirably undergoing phase separation and to minimize stoichiometric changes of water molecules in the salt hydrates that may otherwise occur through evaporation or sorption. Due to the high thermal conductivity of EG (approximately 5-10 W/m·K depending upon the type), PCM-EG composites generally have better charge/discharge rates (higher thermal conductivity) than PCMs alone (k≤1 W/m·K).

Most of these porous materials such as EG, however, are lightweight, have a high surface area, and thus occupy a large volume. Therefore, PCM-EG composites have a low volumetric energy density (approximately 50-70% of the original PCM). Generally, the higher the thermal conductivity (more percentage of EG), the lower the volumetric energy density. Additionally, evaporation or sorption of water molecules is difficult to prevent with open-cell porous or high-surface-area materials. Although it is known that microencapsulation of PCMs (both organic and inorganic) can address several of these issues (e.g., leakage, incongruent melting, low volumetric energy density), there is no reliable method of encapsulating salt hydrates. Encapsulating salt hydrates is highly challenging. No conventional solution-based approach works for salt hydrates. Therefore, a need exists for a method of encapsulating phase change materials.

SUMMARY OF THE INVENTION

A method of encapsulating a phase change material is provided. The method includes providing a co-axial ejector including first and second coaxially-disposed outlets, in which the first outlet is inside of and surrounded by the second outlet. The method further includes feeding a core composition to the first outlet, the core composition including a phase change material, and also feeding a coating composition to the second outlet. The method further includes simultaneously ejecting the core composition and the coating composition from the co-axial ejector onto a collector. The core composition is surrounded by the coating composition and together ejected onto the collector to form a core-shell phase change material fiber. No voltage is applied to the co-axial ejector during ejection from the co-axial ejector, and the method does not include electro spinning.

In specific embodiments, the first and second outlets are concentric.

In some embodiments, the collector is a rotating drum having a moving, rotating surface, and the core composition surrounded by the coating composition together are pulled by the moving surface to form the core-shell phase change material fiber.

In other embodiments, the collector includes a planar surface.

In certain embodiments, the planar surface is one of a stationary or moving surface.

In specific embodiments, the phase change material includes a salt hydrate.

In certain embodiments, the salt hydrate is one or more selected from the group consisting of: lithium chlorate trihydrate ($LiClO_3.3H_2O$), dipotassium hydrogen phosphate hexahydrate ($K_2HPO_4{\cdot}6H_2O$), potassium fluoride tetrahydrate ($KF{\cdot}4H_2O$), manganese nitrate hexahydrate ($Mn(NO_3)_2{\cdot}6H_2O$), calcium chloride hexahydrate ($CaCl_2{\cdot}6H_2O$), sodium sulfate decahydrate ($Na_2SO_4{\cdot}10H_2O$), sodium hydrogen phosphate dodecahydrate ($Na_2HPO_4{\cdot}12H_2O$), zinc nitrate hexahydrate ($Zn(NO_3)_2{\cdot}6H_2O$), iron (III) chloride hexahydrate ($FeCl_3{\cdot}6H_2O$), calcium chloride tetrahydrate ($CaCl_2{\cdot}4H_2O$), calcium nitrate tetrahydrate ($Ca(NO_3)_2{\cdot}4H_2O$), sodium thiosulfate pentahydrate ($Na_2S_2O_3{\cdot}5H_2O$), and sodium acetate trihydrate ($C_2H_3NaO_2{\cdot}3H_2O$).

In particular embodiments, the core composition includes up to 20% by weight of a thermally conductive material.

In particular embodiments, the core composition includes up to 10% by weight of a silica.

In particular embodiments, the core composition includes up to 10% by weight of a thickener.

In particular embodiments, the core composition includes up to 20% by weight of a polymer.

In specific embodiments, the coating composition includes a polymer.

In certain embodiments, the coating composition includes at least 3% by weight of the polymer in an organic solvent.

In certain embodiments, the polymer is one of poly (methyl methacrylate) (PMMA), poly(acrylonitrile) (PAN), and polyethylene (PE).

In certain embodiments, the coating composition includes at least 0.1% by weight of a conductive material.

An encapsulated phase change material is also provided.

In specific embodiments, the encapsulated phase change material is a core-shell fiber having a diameter in the range of 10-10,000 μm.

In certain embodiments, the core constitutes from 30% to 97% by volume of the core-shell fiber.

In certain embodiments, a ratio of a thickness of the core to a thickness of the shell is in the range of 40:60 to 98:2.

In certain embodiments, a thickness of the shell is less than 50% of the overall thickness of the fiber.

These and other features of the invention will be more fully understood and appreciated by reference to the description of the embodiments and the drawings.

DETAILED DESCRIPTION OF THE CURRENT EMBODIMENTS

Figure 1:
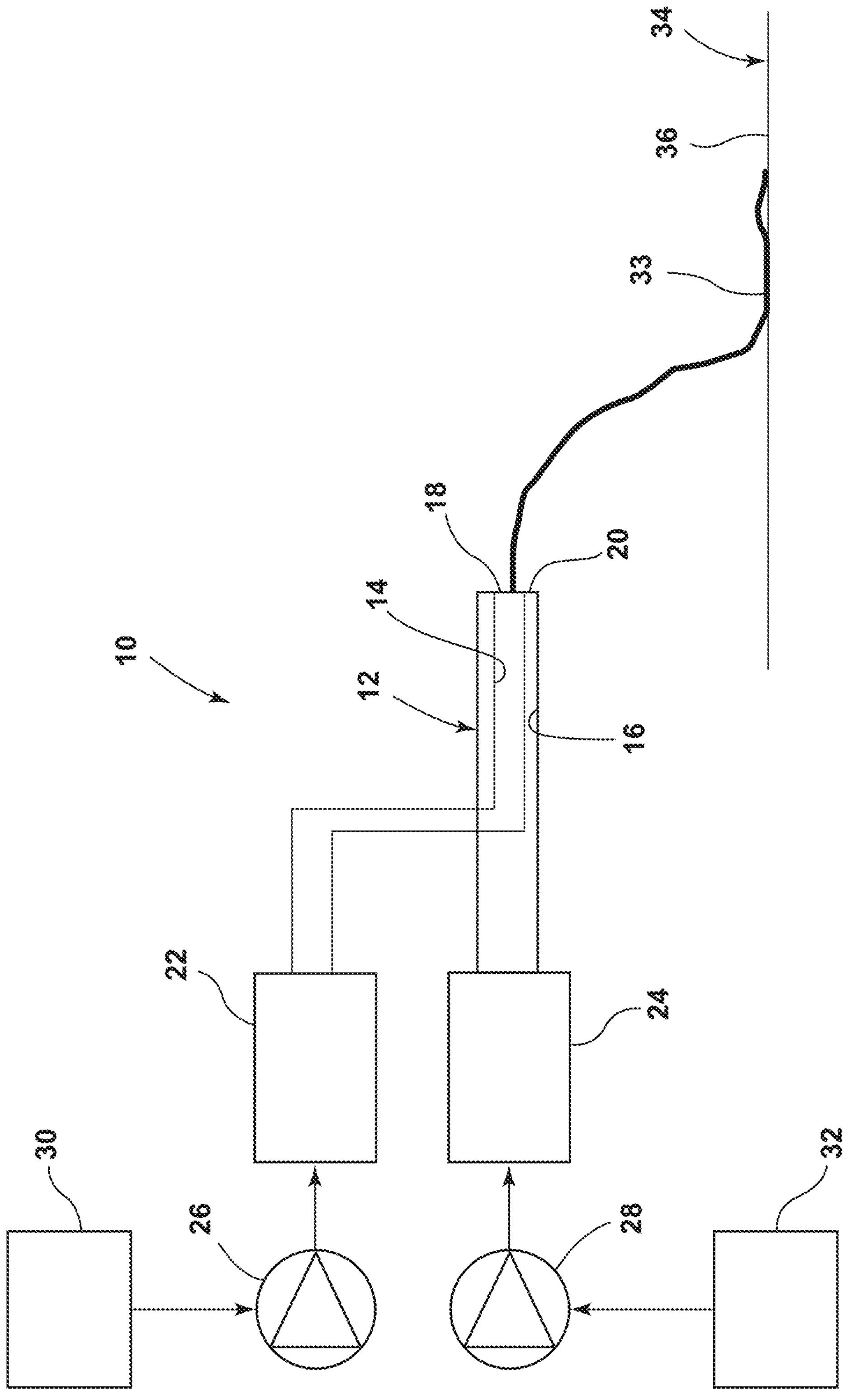
FIG. 1 is a schematic illustration of a method of encapsulating a phase change material in accordance with some embodiments of the disclosure.

As discussed herein, the current embodiments relate to a method of encapsulating a phase change material. As generally illustrated in FIG. 1, the method includes co-axial ejection of phase change material within a polymer shell coating. Particularly, a system 10 including a co-axial ejector 12 is used to simultaneously eject the core phase change material composition and the outer shell coating composition onto a collector to form a core-shell phase change material fiber. In contrast to other methods, the method does not include electrospinning, and no voltage is applied to the ejector during the formation of the core-shell phase change material. Each step of the method is separately discussed below.

Figure 2:
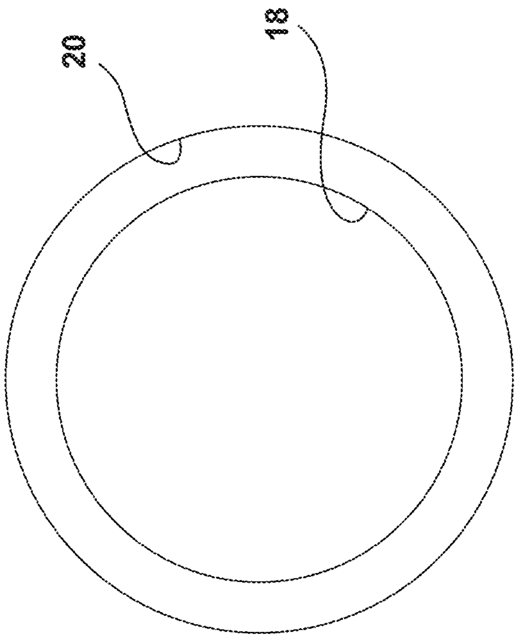
FIG. 2 is a cross-sectional view of a co-axial ejector in accordance with some embodiments of the disclosure.

With reference to FIGS. 1 and 2, the method first includes providing the co-axial ejector 12. The co-axial ejector 12 has first and second outlet passages 14, 16 respectively connected to first and second coaxially-disposed outlet ports 18, 20, the first outlet port 18 being inside of and surrounded by the second outlet port 20. By coaxial it is meant that the first and second outlet ports 18, 20 share the same central, longitudinally extending axis, i.e., the first outlet port 18 is generally centered within the second outlet port 20. In some embodiments, a cross-section of the first and second outlet ports 18, 20 are in the form of concentric circles. The size of the outlet ports 18, 20 are not particularly limited, and by way of example only the diameters of these ports may be in the range of 10 μm to 1,000 μm. The first and second outlet ports 18, 20 together may terminate in a needle or other narrow, elongated open tip. Alternatively, the co-axial ejector 12 may not include a needle or other tip, with the first and second co-axial outlet ports 18, 20 themselves forming the terminal open end of the ejector. The outlet ports 18, 20 and needle (if present) may be formed of a metal, or may be non-metallic (e.g., formed of plastic). A first chamber 22 is connected to and in fluid communication with (fluidly connected to) the first outlet passage 14, and a second chamber 24 is fluidly connected to the second outlet passage 16. In certain embodiments (not shown), the chambers 22, 24 are in the form of simple reciprocating pumps such as a syringe or similar. In other embodiments, the chambers 22, 24 are downstream of one or more electrically powered pumps 26, 28 such as a positive-displacement pump. The pressure output of the pumps may be, for example, at least 50 psi. In these embodiments, at least one of the pumps 26 is fluidly connected to the first chamber 22, and at least one other of the pumps 28 is fluidly connected to the second chamber 24. In certain embodiments, the first outlet passage 14 runs into the second outlet passage 16 and merges with second outlet passage. First and second storage vessels 30, 32 may be respectively connected upstream of the pumps 26, 28 to provide a supply of different fluids as described in more detail below. It should be understood that the structure of the ejector system 10 is shown by way of non-limiting example. Therefore, the structure of the system may be varied within the scope of the disclosure, so long as the first and second outlet ports have a coaxial relationship with one inside of and surrounded by the other.

The method further includes feeding a core composition to the first outlet passage 14. The core composition may be fed by the first pump 26 from the first storage vessel 30 to the first chamber 22 and then downstream through the first outlet passage 14 to the first outlet port 18. The core composition includes one or more phase change materials (PCMs). The phase change material is present in an amount of from 1 to 100 wt. %, optionally from 50 to 100 wt. %, optionally from 75 to 100 wt. %, optionally from 90 to 100 wt. %, or optionally from 95 to 100 wt. %, based on a total weight of the core composition. In some embodiments, the core composition includes at least 60% by weight of phase change material, with the balance being other constituents and additives. In other embodiments, the core composition is pure (only) phase change material, i.e. 100 wt. % phase change material with no other components included in the core composition. A phase change material is generally any substance that absorbs or releases a sufficiently high enough amount of energy at its phase transition (typically solid-liquid transition), i.e., has a significantly high latent heat, to provide heating or cooling at the phase transition temperature. Each phase change material may be an organic or inorganic material. In various embodiments, the phase change material is an inorganic salt hydrate such as but not limited to lithium chlorate trihydrate ($LiClO_3 \cdot 3H_2O$), dipotassium hydrogen phosphate hexahydrate ($K_2HPO_4.6H_2O$), potassium fluoride tetrahydrate ($KF \cdot 4H_2O$), manganese nitrate hexahydrate ($Mn(NO_3)_2 \cdot 6H_2O$), calcium chloride hexahydrate ($CaCl_2 \cdot 6H_2O$), sodium sulfate decahydrate ($Na_2SO_4 \cdot 10H_2O$), sodium hydrogen phosphate dodecahydrate ($Na_2HPO_4 \cdot 12H_2O$), zinc nitrate hexahydrate ($Zn(NO_3)_2 \cdot 6H_2O$), iron (III) chloride hexahydrate ($FeCl_3 \cdot 6H_2O$), calcium chloride tetrahydrate ($CaCl_2 \cdot 4H_2O$), calcium nitrate tetrahydrate ($Ca(NO_3)_2 \cdot 4H_2O$), sodium thiosulfate pentahydrate ($Na_2S_2O_3 \cdot 5H_2O$), and sodium acetate trihydrate ($C_2H_3NaO_2 \cdot 3H_2O$). In other embodiments, the phase change material can be a combination of salt hydrate materials such as but not limited to sodium carbonate decahydrate+disodium phosphate dodecahydrate ($Na_2CO_3 \cdot 10H_2O+Na_2HPO_4 \cdot 12H_2O$), calcium chloride hexahydrate+calcium bromide hexahydrate ($CaCl_2 \cdot 6H_2O+CaBr_2 \cdot 6H_2O$), sodium sulfate decahydrate+sodium biphosphate dodecahydrate ($Na_2SO_4 \cdot 10H_2O+Na_2HPO_4 \cdot 12H_2O$), sodium carbonate decahydrate+sodium biphosphate dodecahydrate ($Na_2CO_3 \cdot 10H_2O+Na_2HPO_4 \cdot 12H_2O$). In yet other embodiments, the phase change material may be an organic material including paraffins (e.g. higher alkanes such as, octadecane, nonadecane, icosane, docosane) or paraffin wax blends, fatty acids and esters, and alcohols (e.g., erythritol). The core composition may include only one of these phase change materials (e.g., the core composition may include only sodium sulfate decahydrate as the phase change material), or the core composition may include a mixture of different phase change materials (e.g., the core composition may include a mixture of sodium sulfate decahydrate and sodium acetate trihydrate, or a mixture of a salt hydrate with an organic phase change material). The core composition may also include up to 20% by weight, optionally up to 15% by weight, optionally up to 10% by weight, optionally up to 5% by weight, optionally up to 1% by weight of a polymer. In some embodiments, the polymer is polyvinylpyrrolidone (PVP). In other embodiments, the core composition does not include any polymer, i.e. the polymer content is essentially 0% by weight. The core composition may also include one or more stabilizers, one or more nucleating agents capable of initiating crystallization upon cooling such as but not limited to tetraborate decahydrate ($Na_2B_4O_7 \cdot 10H_2O$), sodium phosphate dibasic dodecahydrate ($Na_2HPO_4 \cdot 12H_2O$), or strontium chloride hexahydrate ($SrCl_2 \cdot 6H_2O$), and/or other additives that are compatible with the phase change material(s). In various embodiments, the core composition may include up to 20% by weight, optionally up to 15% by weight, optionally up to 10% by weight, optionally up to 5% by weight, optionally up to 1% by weight of thermally conductive material such as but not limited to carbon black, graphite, graphene flakes, sulfonated reduced graphene oxide, and the like. The core composition may also include up to 10% by weight, optionally up to 8% by weight, optionally up to 6% by weight, optionally up to 4% by weight, optionally up to 2% by weight, optionally up to 1% by weight of a silica. The core composition may also include up to 10% by weight, optionally up to 8% by weight, optionally up to 6% by weight, optionally up to 4% by weight, optionally up to 2% by weight, optionally up to 1% by weight of a thickener (capable of increasing viscosity) such as but not limited to sodium polyacrylate, cellulose, guar, and the like.

The method further includes feeding a coating composition to the second outlet passage 16. The coating composition may be fed by the second pump 28 from the second storage vessel 32 to the second chamber 24 and then downstream through the second outlet passage 16 to the second outlet port 20. The coating composition includes a polymer. The polymer is present in an amount that is at least 3% by weight, optionally at least 10% by weight, optionally at least 20% by weight, optionally at least 30% by weight, optionally at least 40% by weight, optionally at least 50% by weight, optionally at least 60% by weight, optionally at least 70% by weight, optionally at least 80% by weight, optionally at least 90% by weight, based on the total weight of the coating composition. The polymer is not particularly limited and is capable of forming a generally impervious shell. In some embodiments, the polymer is one of poly(methyl methacrylate) (PMMA), poly(acrylonitrile) (PAN), and polyethylene (PE). Other polymers that are suitable for the coating composition include but are not limited to ethylene vinyl alcohol (EVOH), polyamide (PA6), polyethylene terephthalate (PET), vinylidene chloride copolymer, acrylonitrile, polyurethane, low-density polyethylene (LDPE), polyvinylidene chloride (PVDC), polycarbonate (PC), polystyrene (PS), polypropylene (PP), high-density polyethylene (HDPE), polyvinyl alcohol (PVA), epoxy resin, polyvinyl acetate (PVAc), polyvinyl toluene (PVT), polyvinyl butyral (PVB), polyvinyl chloride (PVC), and polytetrafluoroethylene (PTFE). The coating composition may also include other additives as well as optional components such as a conductive material such as carbon black, graphite, graphene flakes, and the like. Particularly, the coating composition may include at least 0.1% by weight of the conductive material. The coating composition also may include an organic solvent such as but not limited to n-methyl-2-pyrrolidone (NMP), dimethylformamide (DMF), tetrahydrofuran (THF), ethanol, methanol, isopropanol, dimethyl sulfoxide (DMSO), acetone, and toluene. The solvent may constitute the balance of the core composition. In some embodiments, the conductive material is mixed in the polymer/solvent solution.

Figure 3:
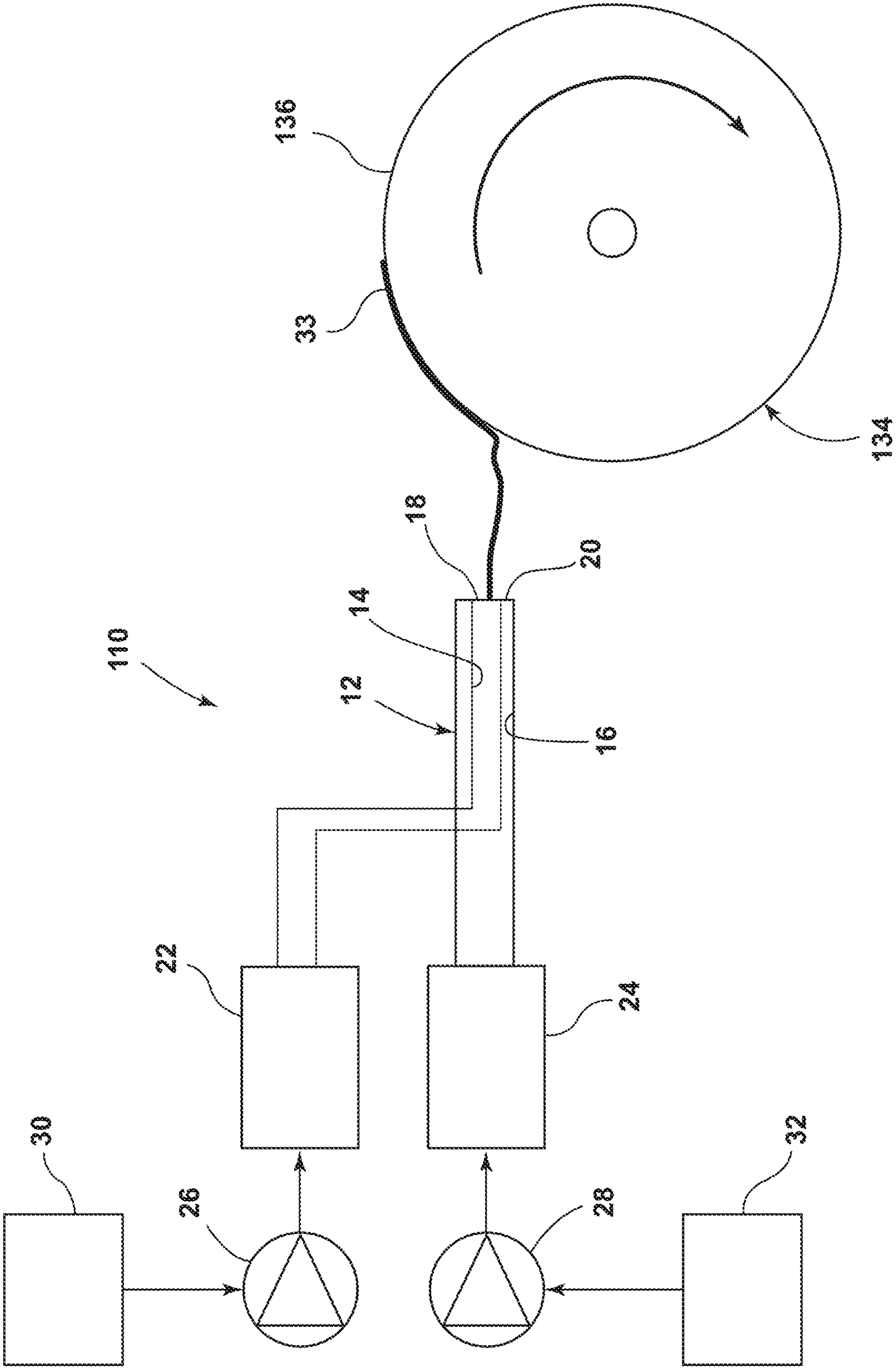
FIG. 3 is a schematic illustration of a method of encapsulating a phase change material in accordance with other embodiments of the disclosure.

The method next includes simultaneously ejecting the core composition and the coating composition from the co-axial ejector 12 through the first and second outlet ports 18, 20 as a fiber string 33 onto a collector 34. The collector 34 generally includes a surface 36 onto which the core and coating compositions are simultaneously ejected. In some embodiments as shown in FIG. 1, the surface 36 is a stationary surface such as a planar surface (e.g., a horizontal plate), a tub, a basin, or the like. In these embodiments, the core composition surrounded by the coating composition together are formed into the core-shell phase change material fiber 33 solely by the ejection (pushing) force exerted onto the core and coating compositions by the pumps 26, 28 and gravitational force after ejection when freely dropping from the ejector onto the surface. In other embodiments, the surface is a moving surface such as a cylindrical surface of a rotating drum or a planar surface of a rotating belt. For example, as shown in FIG. 3, the system 110 may include a collector 134 that is a rotating drum having a cylindrical collection surface 136. In these embodiments, the core composition surrounded by the coating composition together are pulled as a fiber string 33 by the force of the moving surface to form a core-shell phase change material fiber. Importantly, in all of these embodiments, no (zero) voltage is applied to the co-axial ejector 12 (e.g., no voltage is applied to the first and second outlet passages 14, 16 and ports 18, 20) during ejection of the core and coating compositions from the ejector 12. Hence, the present method does not include electrospinning, in which a voltage is applied directly or indirectly to the ejected compositions at the point of ejection and the collection surface is grounded such that electrical forces influence the formation of the fibers. Again, in the present method there is no application of an electric voltage, current, or any other charge to the core composition or coating composition during the process including during the ejection from the ejector. Outside of the pumping force exerted by the pumps to flow the core and coating compositions through the ejector, the only forces acting on the ejected core and coating compositions are the force of gravity, and a pulling force in the case that the collector surface is a moving surface, i.e. no electrical forces are applied to the core and coating compositions.

Figure 4:
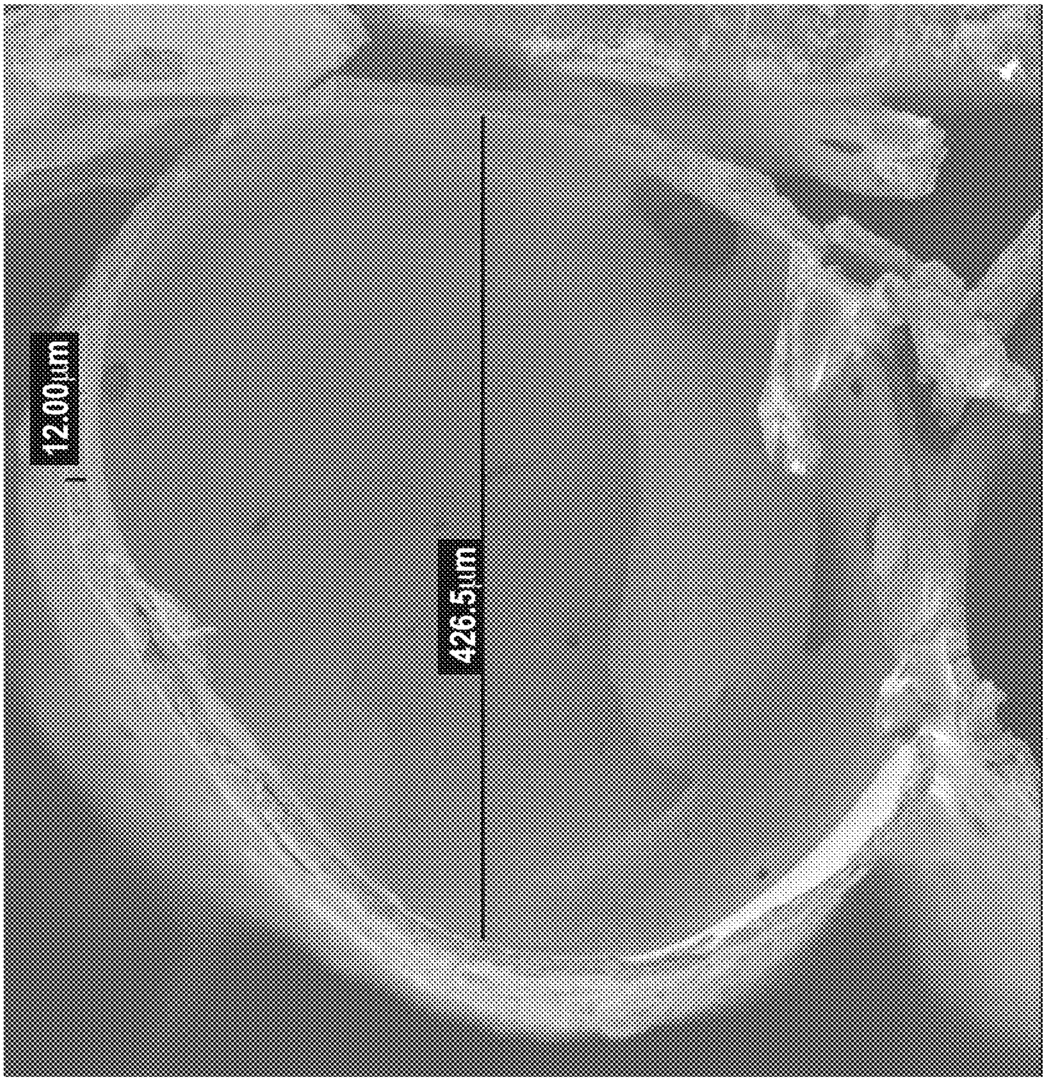
FIG. 4 is a cross-sectional view of an encapsulated phase change material obtained by the method.

The core-shell phase change material fiber formed by the method described above is a fiber in which the phase change material of the core is encapsulated within an elongated polymer shell in the form of a fibrous strand or string. In preferred embodiments, the thusly formed encapsulated phase change material is a fiber having a cross-sectional diameter (in a direction transverse or perpendicular to the elongated axial direction of the fiber) that is in the range of 10 to 10,000 μm. Fibers or particles in the nanoscale size range are not suitable because the surface area of the nanoscale materials becomes too high. Even when minimizing the size of the shell relative to the core, the overall volume of coating/shell relative to the core is too high, thereby reducing the volumetric energy density of the fibers. In other words, the smaller the diameter of the fiber, the lower the volumetric energy density. On the other hand, fibers in the range of 10 to 10,000 μm (microencapsulation) have suitably high volumetric energy densities. In some embodiments, the inner core constitutes up to 30% by volume of the total thickness of the core-shell, alternatively up to 40% by volume, alternatively up to 50% by volume, alternatively up to 60% by volume, alternatively up to 70% by volume, alternatively up to 80% by volume, alternatively up to 90% by volume, alternatively up to 95% by volume, alternatively up to 97% by volume. Also, a ratio of the length of the thickness of the core to a length of the thickness of the shell is in the range of 40:60 to 98:2. For example, the inner core may have a diameter in the range of 400 to 500 μm whereas the outer shell may have a thickness in the range of 10 to 15 μm. In certain preferred embodiments, the thickness of the shell is less than 50% of the overall thickness of the fiber, alternatively less than 40% of the overall thickness, alternatively less than 30% of the overall thickness, alternatively less than 20% of the overall thickness, alternatively less than 10% of the overall thickness, such that the core is larger than the shell. To achieve sufficient volumetric energy density, the fibers are preferably as thick as possible while minimizing the thickness of the shell/coating. One example of a core-shell fiber is shown in FIG. 4. The core has a diameter of approximately 426.5 μm and the shell has a thickness of approximately 12.00 μm such that the outer diameter of the fiber is approximately 438.5 μm and the fiber is in the range of 93-94% phase change material (core) and 6-7% coating (shell).

The encapsulated phase change material fibers may be used in various applications. For example, they may be used in building construction as thermal storage and release materials in the building envelope. The fibers may also be used for thermal management of batteries such as batteries used in electric vehicles. Further, the fibers may be used in heat exchanger applications, or any other application that requires or can benefit from thermal energy storage and/or heat management.

EXAMPLES

The present method is further described in connection with the following laboratory examples, which are intended to be non-limiting.

Figure 5:
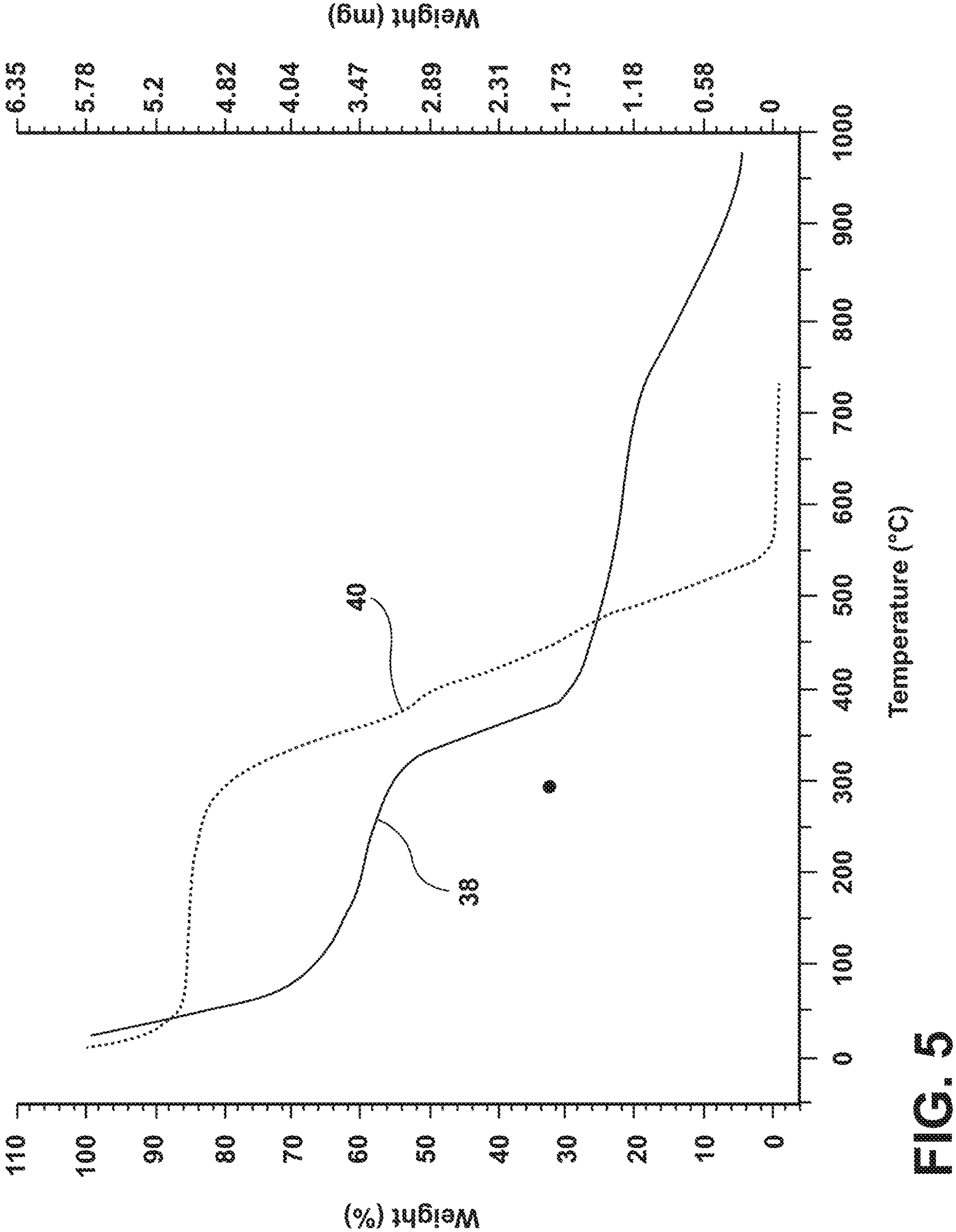
FIG. 5 is a graph illustrating a thermogravimetric analysis of encapsulated phase change material fibers in comparison with core-shell fibers without a phase change material therein.

In one example, the core composition included 60% calcium chloride hexahydrate ($CaCl_2 \cdot 6H_2O$), 5% polyvinylpyrrolidone (PVP), and 35% excess water. In other examples, the core composition may be in the range of 95-100% phase change material and the balance other additives such as carbon black or silica (for example 5% carbon black, or 5% silica, or 2.5% carbon black and 2.5% silica). The shell composition included 10% poly(methyl methacrylate) (PMMA) in n-methyl-2-pyrrolidone (NMP). The core and shell compositions were simultaneously ejected from the needle of the ejector directly onto a rotating drum that pulled the core-shell combination on the drum to form the encapsulated core-shell fibers. Energy dispersive X-ray (EDX) analysis showed that shell contains carbon and oxygen, but no calcium or chlorine, whereas the core includes calcium and chlorine, thereby confirming that core-shell fibers were formed. Further, a thermogravimetric analysis (TGA) was performed on the core-shell fibers. TGA involves measuring the mass of a sample over time with a change in temperature, and provides information such as absorption, adsorption/desorption, phase transition, and thermal decomposition. As shown graphically in FIG. 5, thermogravimetric analysis of the obtained core-shell fibers (line 38) in comparison to a core-shell fiber having no salt hydrate (line 40) (control sample with core of 10% PVP with shell of 10% PMMA) indicated that there is more water in salt hydrate fibers compared in comparison to the control sample, with 40% water vapor in the obtained core-shell fibers while only 16% water vapor in the control sample (water vapor being the content above the lines). The 24% difference between the two corresponds to 1.4 mg of additional water in the obtained core-shell fiber relative to the control sample.

Figure 7:
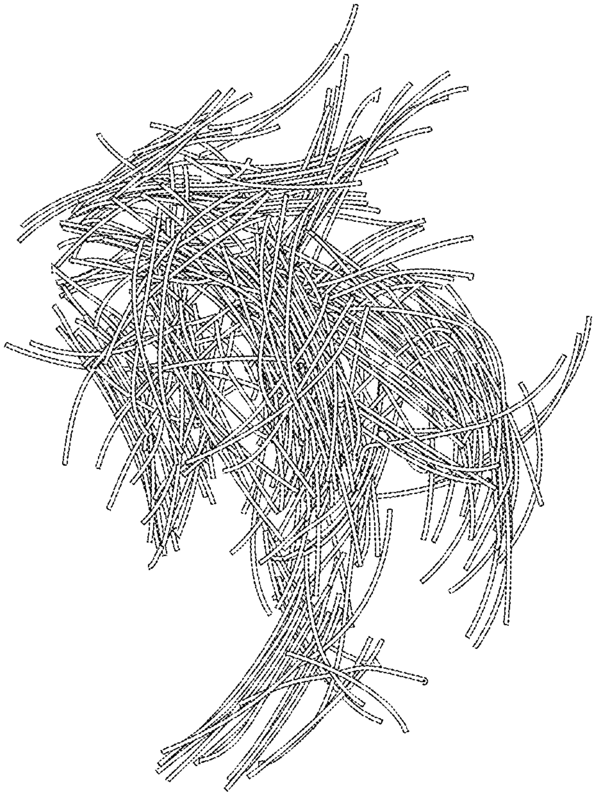
FIG. 7 is a perspective view of strands of the core-shell fibers of FIG. 6.
Figure 6:
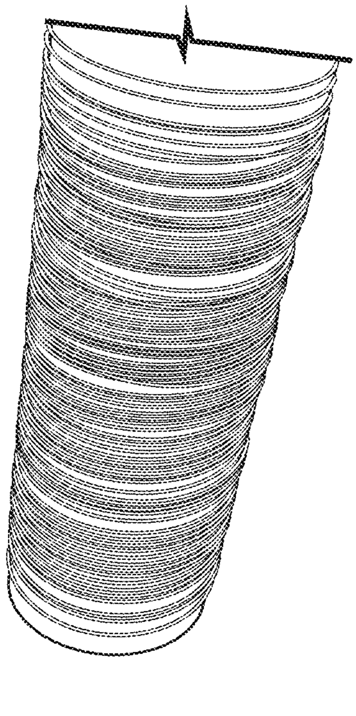
FIG. 6 is a perspective view of core-shell fibers pulled by a rotating drum.

In another example, the core composition included a solution of 80% $CaCl_2 \cdot 6H_2O$ and 2% PVP in water, and the shell composition included a solution of 10% PMMA in DMF. The core and shell compositions were pulled by a rotating drum to obtain core-shell fibers such as shown in FIGS. 6 and 7.

Figure 8:
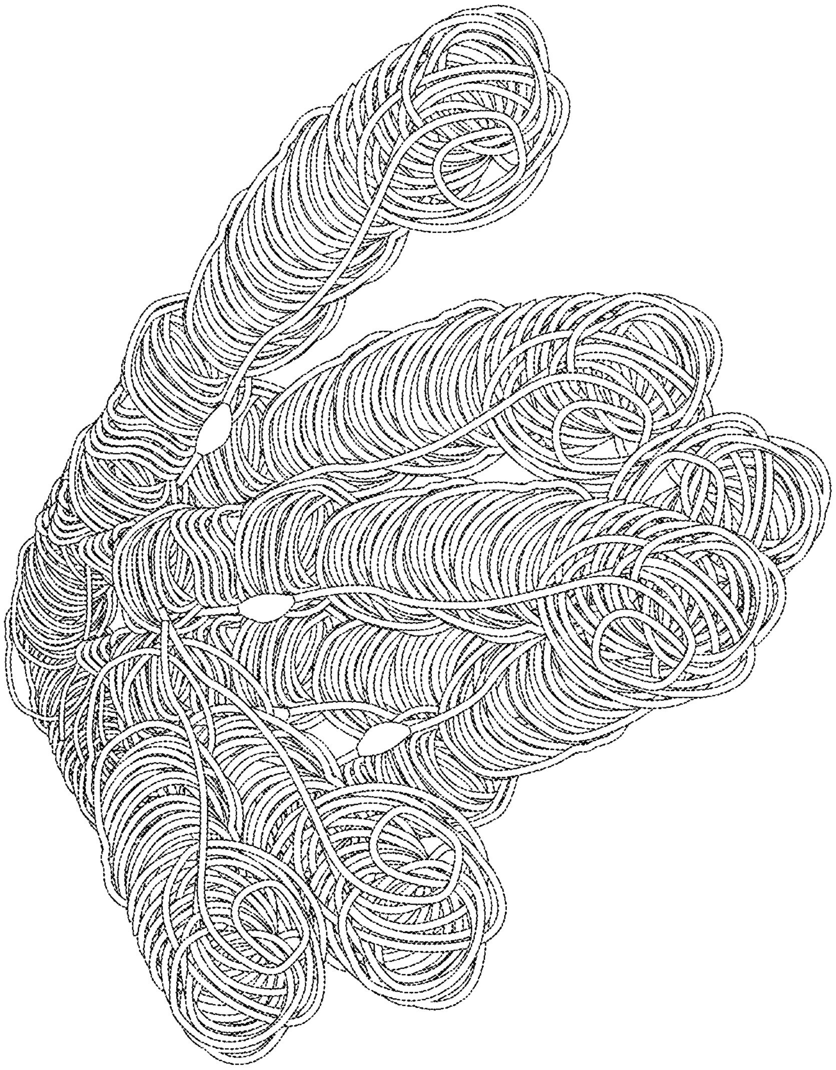
FIG. 8 is a perspective view of core-shell fibers pulled by gravitational force when ejected onto a stationary surface.

In yet another example, a core composition including $CaCl_2 \cdot 6H_2O$ and $SrCl_2$ and a shell composition including PMMA were pushed by a syringe pump and pulled down by gravitational force onto a glass surface to obtain core-shell fibers such as shown in FIG. 8.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of encapsulating a phase change material, the method comprising:

providing a co-axial ejector including first and second coaxially-disposed outlets, wherein the first outlet is inside of and surrounded by the second outlet;

feeding a core composition to the first outlet, wherein the core composition includes a phase change material;

feeding a coating composition to the second outlet; and simultaneously ejecting the core composition and the coating composition from the co-axial ejector onto a collector;

wherein no voltage is applied to the co-axial ejector during ejection from the co-axial ejector, the method does not include electrospinning, and the core composition is surrounded by the coating composition and together ejected onto the collector to form a core-shell phase change material fiber that is a fibrous strand or string.

2. The method of claim 1, wherein the first and second outlets are concentric.

3. The method of claim 1, wherein the collector is a rotating drum having a moving, rotating surface, and the core composition surrounded by the coating composition together are pulled by the moving surface to form the core-shell phase change material fiber.

4. The method of claim 1, wherein the collector includes a planar surface.

5. The method of claim 4, wherein the planar surface is one of a stationary or moving surface.

6. The method of claim 1, wherein the phase change material includes a salt hydrate.

7. The method of claim 6, wherein the salt hydrate is one or more selected from the group consisting of: lithium chlorate trihydrate ($LiClO_3 \cdot 3H_2O$), dipotassium hydrogen phosphate hexahydrate ($K_2HPO_4 \cdot 6H_2O$), potassium fluoride tetrahydrate ($KF \cdot 4H_2O$), manganese nitrate hexahydrate ($Mn(NO_3)_2 \cdot 6H_2O$), calcium chloride hexahydrate ($CaCl_2 \cdot 6H_2O$), sodium sulfate decahydrate ($Na_2SO_4 \cdot 10H_2O$), sodium hydrogen phosphate dodecahydrate ($Na_2HPO_4 \cdot 12H_2O$), zinc nitrate hexahydrate ($Zn(NO_3)_2 \cdot 6H_2O$), iron (III) chloride hexahydrate ($FeCl_3 \cdot 6H_2O$), calcium chloride tetrahydrate ($CaCl_2 \cdot 4H_2O$), calcium nitrate tetrahydrate ($Ca(NO_3)_2 \cdot 4H_2O$), sodium thiosulfate pentahydrate ($Na_2S_2O_3 \cdot 5H_2O$), and sodium acetate trihydrate ($C_2H_3NaO_2 \cdot 3H_2O$).

8. The method of claim 7, wherein the core composition includes up to 20% by weight of a thermally conductive material.

9. The method of claim 7, wherein the core composition includes up to 10% by weight of a silica.

10. The method of claim 7, wherein the core composition includes up to 10% by weight of a thickener.

11. The method of claim 7, wherein the core composition includes up to 20% by weight of a polymer.

12. The method of claim 1, wherein the coating composition includes a polymer.

13. The method of claim 12, wherein the coating composition includes at least 3% by weight of the polymer in an organic solvent.

14. The method of claim 12, wherein the polymer is one of poly(methyl methacrylate) (PMMA), poly(acrylonitrile) (PAN), and polyethylene (PE).

15. The method of claim 12, wherein the coating composition includes at least 0.1% by weight of a conductive material.

* * * * *